(12) United States Patent
Mekkattuparamban et al.

(10) Patent No.: US 7,787,379 B2
(45) Date of Patent: Aug. 31, 2010

(54) INTEGRATED FLOW CONTROL

(75) Inventors: Joji Thomas Mekkattuparamban, Sunnyvale, CA (US); Akshya Kumar Singh, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 120 days.

(21) Appl. No.: 12/132,089

(22) Filed: Jun. 3, 2008

(65) Prior Publication Data

US 2009/0296581 A1 Dec. 3, 2009

(51) Int. Cl.
*H04L 1/00* (2006.01)
(52) U.S. Cl. ...................................... 370/235
(58) Field of Classification Search ................... 370/235
See application file for complete search history.

(56) References Cited

U.S. PATENT DOCUMENTS

| | | | | |
|---|---|---|---|---|
| 5,978,849 A | * | 11/1999 | Khanna | 709/227 |
| 6,049,833 A | * | 4/2000 | Chan et al. | 709/237 |
| 6,744,730 B2 | * | 6/2004 | Le et al. | 370/229 |
| 6,876,639 B1 | * | 4/2005 | Cao | 370/331 |
| 2006/0023634 A1 | * | 2/2006 | Morandin | 370/252 |
| 2007/0091902 A1 | * | 4/2007 | Stewart et al. | 370/401 |

* cited by examiner

*Primary Examiner*—Derrick W Ferris
*Assistant Examiner*—Mang Yeung
(74) *Attorney, Agent, or Firm*—Tucker Ellis & West LLP

(57) ABSTRACT

Described herein is a flow control scheme suitably adaptable to Transmission Control Protocol (TCP) and Stream Control Transmission Protocol (SCTP). In an example embodiment, the guaranteed and maximum allowable bandwidths are employed to determine the size of the congestion window. For example, the flow congestion window size starts proportional to the guaranteed bandwidth and increases until reaching the maximum allowable bandwidth. In particular embodiments, a fixed value is used for determining how fast the congestion window increases. For example the congestion window may increase exponentially while the current size of the congestion window is at or below a fixed value, and increase linearly when the current size of the congestion window is above the fixed value. In an example embodiment, the fixed value does not change even if a collision is detected and the current amount of unacknowledged data allowed is reset to an initial value.

14 Claims, 4 Drawing Sheets

US 7,787,379 B2

INTEGRATED FLOW CONTROL

TECHNICAL FIELD

The present disclosure relates generally to communications such as message stream communications.

BACKGROUND

Transmission Control Protocol (TCP) flow control problems across a long pipe, such as a satellite link, are well documented. Stream Control Transmission Protocol (SCTP), which inherited its basic flow control scheme from TCP, incorporates some changes to address the drawbacks of TCP. SCTP, however, only achieves limited improvement over traditional TCP flow control.

BRIEF DESCRIPTION OF THE DRAWINGS

The accompanying drawings incorporated herein and forming a part of the specification illustrate the examples embodiments.

OVERVIEW OF EXAMPLE EMBODIMENTS

Figure 1:
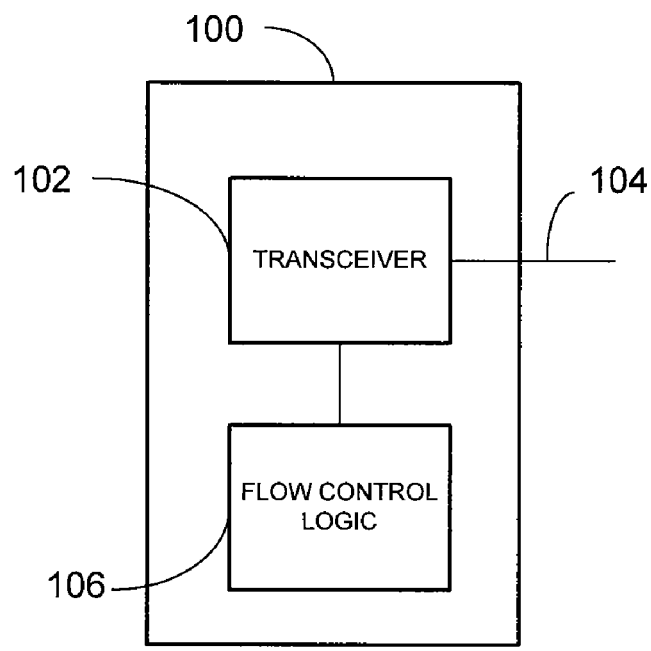
FIG. 1 illustrates an example of an apparatus for transmitting a data stream with flow control.

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

In accordance with an example embodiment, there is disclosed herein, an apparatus, comprising a transceiver and flow control logic coupled to the transceiver and operable to control the operation of the transceiver. The flow control logic is configured to initially send a first predetermined amount of unacknowledged data for a flow. The flow control logic is further configured to increase the amount of unacknowledged data to send for the flow responsive to receiving an acknowledgement of a previously sent unacknowledged data until reaching a maximum preset value. The maximum preset value is proportional to a maximum amount of available bandwidth for the flow.

In accordance with an example embodiment, there is disclosed herein, a method comprising setting a maximum value for a congestion window for a flow that is proportional to a maximum amount of available bandwidth for the flow and setting a predetermined amount of data to send before waiting for an acknowledgement. The predetermined amount of data is sent. The method further comprises waiting for the acknowledgement and increasing the predetermined amount of data to send before waiting for an acknowledgement responsive to receiving the acknowledgement and the increased predetermined amount of data is less than the maximum value.

DESCRIPTION OF EXAMPLE EMBODIMENTS

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

The example embodiments herein are explained in the context of a Stream Control Transmission Protocol (SCTP) compatible system. This is done merely for ease of illustration and explanation as those skilled in the art should readily appreciate that the principles and aspects described herein can be suitably adapted to any streaming protocol. Thus, the description herein should be considered applicable to any streaming data protocol and should not be construed as limited to SCTP compatible systems.

In an example embodiment disclosed herein is a flow control scheme that sets a maximum value for the number of unacknowledged bytes that can be outstanding at any time (referred to in SCTP and TCP as a "Congestion Window"). In particular embodiments, the maximum value is set to the product of maximum bandwidth and round trip time. The maximum bandwidth of a flow, for example a SCTP pipe, can be set by an administrator. In an example embodiment, an endpoint of a data flow, e.g. an SCTP endpoint, has inherent knowledge of the round trip time. Increasing the number of unacknowledged bytes beyond the maximum value will result in packet loss due to congestion; therefore, the flow control scheme of an example embodiment increases the number of unacknowledged bytes until the maximum value is reached.

For example, SCTP uses a parameter called 'cwnd', the congestion window size, to limit the number of unacknowledged number of bytes that can be outstanding at any time. This is a means of stopping the link between two places from getting overloaded with too much traffic. The size of this window is calculated by estimating how much congestion there is between the two places. Once this size is calculated that is the maximum number of bytes that can be transmitted without acknowledgment that they have been received (done through Acknowledgement "ACK" packets). Basically the size of the window, to a large degree, controls the speed of transmission as transmission pauses until there is acknowledgment. CWND is initially started at a small initial value and incremented each time data is acknowledged. If data is not acknowledged, cwnd is drastically reduced. Graphically, cwnd may appear as a saw tooth wave.

SCTP has two modes of operation for flow control, Slow Start and Congestion Avoidance. During slow start, the algorithm begins in the exponential growth phase initially with a congestion window size (cwnd) of 1 or 2 segments and increases it by 1 Segment Size (SS) for each ACK received. This behavior effectively doubles the window size each round trip of the network. This behavior continues until the congestion window size (cwnd) reaches the size of the receiver's advertised window (for example the receiver's buffer memory capacity) or until a loss occurs. For purposes of discussion herein, it is assumed that cwnd does not reach the size of the receiver's advertised window. In congestion avoidance, the window size increases at a slower rate. For example, in Slow Start, the Congestion Window grows exponentially whereas in Congestion Avoidance the Congestion Window grows linearly.

A parameter called SSThresh determines whether flow operates in Slow Start or Congestion Avoidance mode. If cwnd<=SSThresh, the flow operates in slow start mode; if cwnd>SSThresh then the flow operates in Congestion Avoidance mode. SCTP starts with a high value for SSThresh. Each time a packet loss is encountered (no ACK is received), SSThresh is set to a max(cwnd/2, 2*MTU), or in IETF RFC 4960, September 2007, max(cwnd/2, 4*MTU), where the Maximum Transmission Unit (MTU) is the largest number of bytes of "payload" data a frame can carry, not counting the frame's header and trailer.

In an example embodiment, the mode of operation for the flow is determined by a fixed value. For example, SSThresh described above can be set to the product of guaranteed bandwidth and round trip time. An administrator can configure the guaranteed bandwidth for the flow. The round trip time can be determined by the system.

FIG. 1 illustrates an example of an apparatus 100 for transmitting a data stream with flow control. Apparatus 100 comprises a transceiver 102 for sending data across a medium 104 and flow control logic 106 coupled to the transceiver and operable to control the operation of transceiver 102.

Transceiver 102 may be any wired or wireless transceiver and may send signals on media 104 such as baseband, radio frequency (RF), infra-red (IR) and/or optical.

Flow control logic 106 is configured to initially send a first predetermined amount of unacknowledged data for a flow. Flow control logic 106 is configured to increase the amount of unacknowledged data to send for the flow responsive to receiving an acknowledgement of a previously sent unacknowledged data until reaching a maximum preset value, wherein the maximum preset value is proportional to a maximum amount of available bandwidth for the flow. "Logic", as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit (ASIC), a programmable/programmed logic device, memory device containing instructions, or the like, or combinational logic embodied in hardware. Logic may also be fully embodied as software.

In an example embodiment, the maximum preset value is a product of maximum amount of available bandwidth for the flow and round trip time (RTT). Flow control logic 106 has knowledge of the round trip time. In particular embodiments, flow control logic 106 can determine round trip time during setup of the flow.

In an example embodiment, the first predetermined amount of data is proportional to a guaranteed bandwidth for the flow. For example, the first predetermined amount of data can be a product of guaranteed bandwidth for the flow and round trip time. In an example embodiment, the first predetermined amount of data is less than the product of guaranteed bandwidth for the flow and round trip time. In other example embodiments, the first determined amount of data is set equal to another predetermined value such as a segment.

In an example embodiment, flow control logic 106 is configured to increase the amount of unacknowledged data by a first amount responsive to determining the first predetermined amount of data is less than a predetermined threshold (for example SSThresh for a TCP or SCTP compatible flow). Flow control logic 106 can also be configured to increase the amount of unacknowledged data by the first amount responsive to determining the first predetermined amount of data is equal to the predetermined threshold. Flow control logic 106 is further configured to increase the amount of unacknowledged data by a second amount responsive to determining the first predetermined amount of data is greater than the predetermined threshold.

For example, the predetermined threshold can be a product of guaranteed bandwidth and round trip time. Control logic 106 increases the amount of unacknowledged data exponentially if the current setting for unacknowledged data allowed for a flow is less than and/or equal to the predetermined threshold, while increasing the amount of unacknowledged data linearly if the current setting for unacknowledged data allowed for a flow is greater than the predetermined threshold.

For example, for a SCTP flow, the initial value for the congestion window, which sets the amount of unacknowledged data allowed for the flow, set by control logic 106 may be a segment. After each successful transmission, such as a transmission which is acknowledged within a predetermined amount of time, the size of the congestion window is increased. If the current size of the congestion window is less than or equal to SSThresh (which in an example embodiment is set to the product of guaranteed bandwidth and round trip time), the congestion window increases exponentially. If the current size of the congestion window is greater than SSThresh, then the congestion window increases linearly.

In an example embodiment, the size of SSThresh remains unchanged. For example, in a SCTP flow, if a transmission is unacknowledged within a predetermined time period, the congestion window size is reset and SSThresh is set to max(cwnd/2, k*MTU), where k is an integer such as 2 or 4; whereas in accordance with an aspect of an example embodiment, the size of SSThresh remains unchanged, even after the size of the congestion window is reset.

Figure 2:
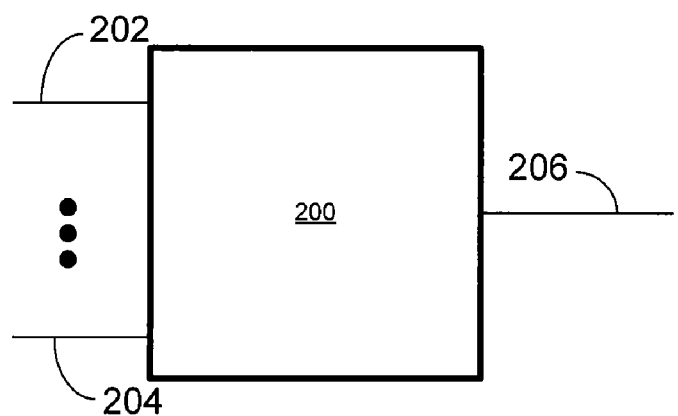
FIG. 2 Illustrates an example of an apparatus for transmitting a data stream with multiple input streams.

FIG. 2 Illustrates an example of an apparatus 200 for transmitting a data stream with multiple input streams. Apparatus 200 may suitably comprise a transceiver such as transceiver 102 described in FIG. 1 and control logic configured in accordance to an example embodiment described for control logic 106 described in FIG. 1.

Apparatus 200 comprises a plurality of input streams 202, 204, and an output stream 206. Although two input streams 202, 204 are illustrated, the example embodiment should not be construed as limited to two input streams as apparatus 200 may suitably comprise any physically realizable number of input streams.

For example, apparatus 200 can be used for implementing a SCTP endpoint. Input streams 202, 204 may be TCP streams and stream 206 a SCTP stream. Apparatus 200 acts as a proxy endpoint for streams 202, 204 Streams 202, 204 can be combined into a single SCTP flow 206. Logic (not shown) in apparatus 200 is configured to set a maximum value for the congestion window for the SCTP flow. In an example embodiment the logic sets an initial value for the congestion window. After each successful transmission, the size of the congestion window is increased. The amount of the increase may be controlled by a threshold variable such as SSThresh. If the size of the current congestion window is at or below SSThresh, the size of the congestion window increases linearly, whereas if the current size of the congestion window is greater than SSThresh, the size of the congestion window increases linearly. In an example embodiment, the value of SSThresh is static. Thus, if a data stream is not acknowledged, the congestion window may be reset to the initial size, however, SSThresh remains unchanged (unlike SCTP which also changes the value of SSThresh).

Figure 3:
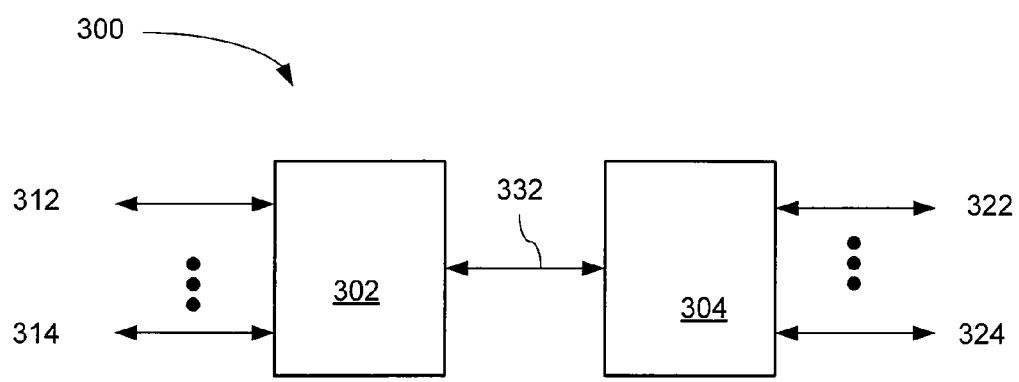
FIG. 3 illustrates an example of a system employing proxy endpoints.

FIG. 3 illustrates an example of a system 300 employing proxy endpoints 302, 304. System 300 may be employed to implement a satellite link between networks. In the illustrated example, endpoint 302 is an endpoint for a plurality of flows 312, 314 and endpoint 304 is an endpoint for a second plurality of flows 322, 324. Endpoints 302, 304 are coupled by flow 332.

In an example embodiment, flows 312, 314, 322, 324 are TCP flows and flow 332 is a SCTP flow. Either or both of endpoints 302, 304 may be configured as described in an example embodiment for apparatus 100 (FIG. 1). For example, endpoint 302 or 304 may set a maximum value for a congestion window for flow 332.

For example, endpoint 302 acts as a proxy endpoint for flows 312, 314. Flows 312, 314 are combined by flow control logic, such as for example flow control logic 106 described in FIG. 1, and sent along flow 332, a SCTP compatible flow (for example a SCTP pipe). Endpoint 302 sets a maximum congestion window size for SCTP pipe 332 and starts at an initial value, such as a segment or a product of available bandwidth and round trip time. Each time endpoint 302 sends data across SCTP pipe 332 it waits for an acknowledgement from endpoint 304. If an acknowledgement is received, then the size of the congestion window is increased until the maximum congestion window size is reached. The size of the increase can be governed by a threshold such as SSThresh. If the current size of the congestion window is less than and/or equal to SSThresh, then the congestion window can be increased in size exponentially, for example using Slow Start. If the size of the congestion window is greater than SSThresh, then the size of the window is increased linearly, such as in collision avoidance mode. In an example embodiment, if data sent by endpoint 302 is not acknowledged by endpoint 304, then endpoint 302 resets the congestion window to the initial value; however, the value of SSThresh remains unchanged, thus keeping the flow in Slow Start mode where appropriate to ensure a fast increase in congestion window size.

Figure 4:
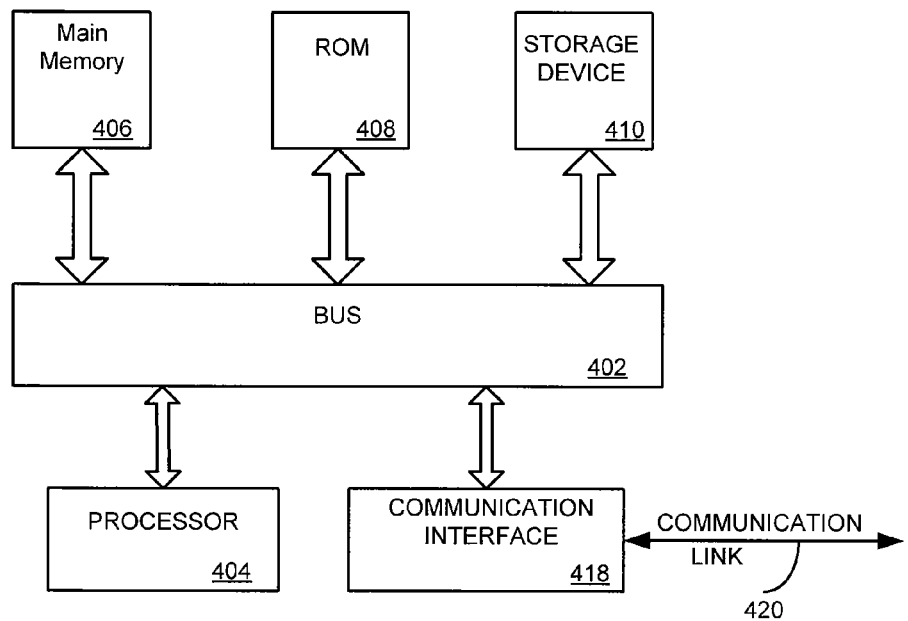
FIG. 4 illustrates an example of a computer system upon which an example embodiment may be implemented.

FIG. 4 illustrates an example of a computer system upon which an example embodiment may be implemented. Computer system 400 is suitable for implementing control logic 106 (FIG. 1) described herein or for implementing control logic for apparatus 200 (FIG. 2), and/or endpoints 302, 304. Computer system 400 includes a bus 402 or other communication mechanism for communicating information and a processor 404 coupled with bus 402 for processing information. Computer system 400 also includes a main memory 406, such as random access memory (RAM) or other dynamic storage device coupled to bus 402 for storing information and instructions to be executed by processor 404. Main memory 406 also may be used for storing a temporary variable or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

An aspect of the example embodiment is related to the use of computer system 400 for integrated flow control. According to an example embodiment, integrated flow control is provided by computer system 400 in response to processor 404 executing one or more sequences of one or more instructions contained in main memory 406. Such instructions may be read into main memory 406 from another computer-readable medium, such as storage device 410. Execution of the sequence of instructions contained in main memory 406 causes processor 404 to perform the process steps described herein. One or more processors in a multi-processing arrangement may also be employed to execute the sequences of instructions contained in main memory 406. In alternative embodiments, hard-wired circuitry may be used in place of or in combination with software instructions to implement an example embodiment. Thus, embodiments described herein are not limited to any specific combination of hardware circuitry and software.

The term "computer-readable medium" as used herein refers to any medium that participates in providing instructions to processor 404 for execution. Such a medium may take many forms, including but not limited to non-volatile media, volatile media, and transmission media. Non-volatile media include for example optical or magnetic disks, such as storage device 410. Volatile media include dynamic memory such as main memory 406. Transmission media include coaxial cables, copper wire and fiber optics, including the wires that comprise bus 402. Transmission media can also take the form of acoustic or light waves such as those generated during radio frequency (RF) and infrared (IR) data communications. Common forms of computer-readable media include for example floppy disk, a flexible disk, hard disk, magnetic cards, paper tape, any other physical medium with patterns of holes, a RAM, a PROM, an EPROM, a FLASHPROM, CD, DVD or any other memory chip or cartridge, or any other medium from which a computer can read.

Various forms of computer-readable media may be involved in carrying one or more sequences of one or more instructions to processor 404 for execution. For example, the instructions may initially be borne on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector coupled to bus 402 can receive the data carried in the infrared signal and place the data on bus 402. Bus 402 carries the data to main memory 406 from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 may suitably a wired or wireless communication transceiver used for providing the flow being controlled by processor 404. In an example embodiment, multiple communication interfaces are employed for multiple flows. For example in endpoint 302 one or more communication interfaces can be employed to receive flows 312, 314 and another communication interface can be employed for SCTP pipe 332.

Figure 5:
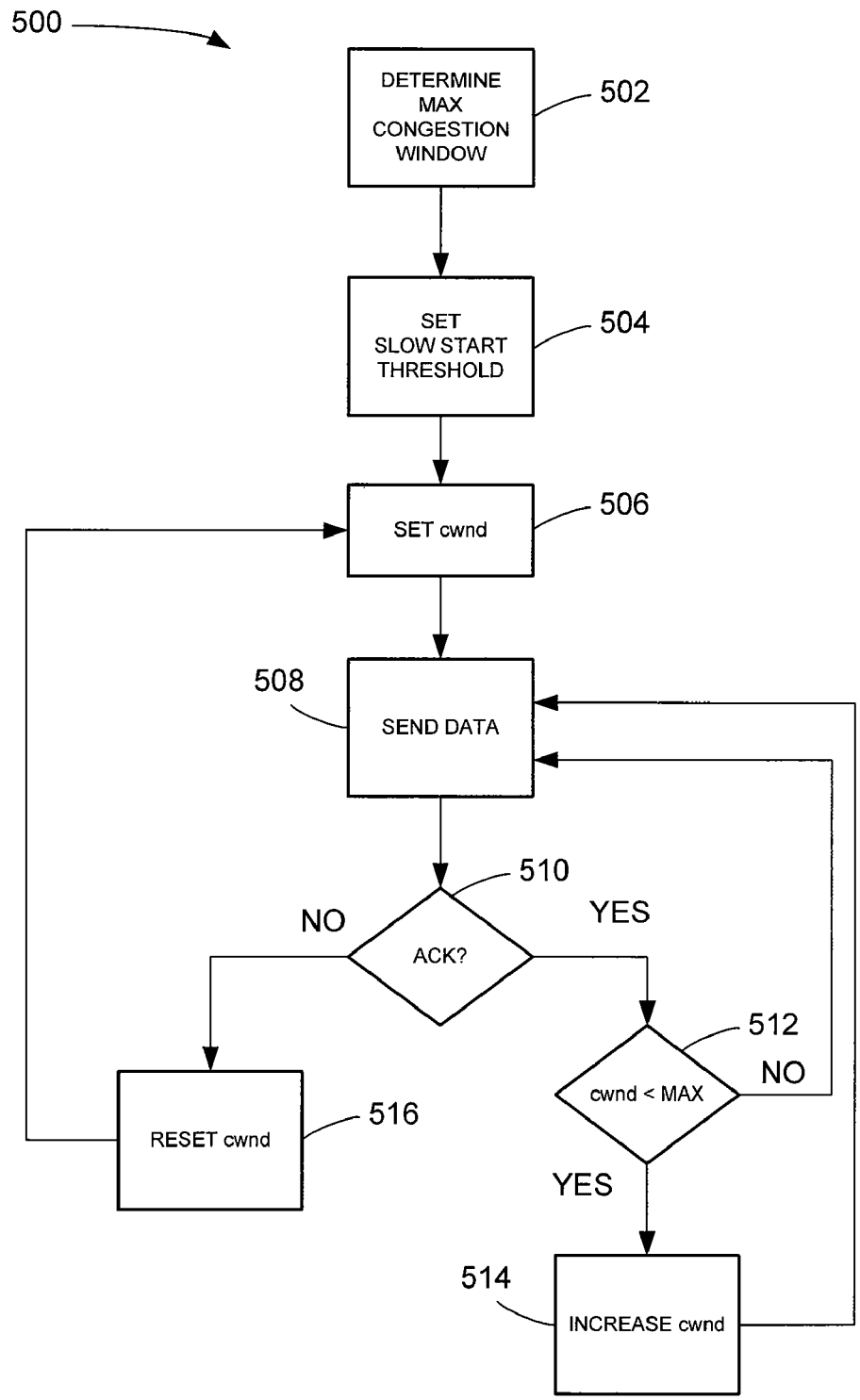
FIG. 5 illustrates an example methodology.

In view of the foregoing structural and functional features described above, a methodology 500 in accordance with an example embodiment will be better appreciated with reference to FIG. 5. While, for purposes of simplicity of explanation, methodology 500 of FIG. 5 is shown and described as executing serially, it is to be understood and appreciated that the example embodiment is not limited by the illustrated order, as some aspects could occur in different orders and/or concurrently with other aspects from that shown and described herein. Moreover, not all illustrated features may be required to implement a methodology in accordance with an aspect of the example embodiment. Methodology 500 described herein is suitably adapted to be implemented in hardware, software, or a combination thereof.

At 502 a maximum value is set for the congestion window size (cwnd). In an example embodiment, the maximum value is set to the product of the maximum allowable bandwidth and round trip time.

At 504, the slow start threshold (SSThresh) is set. In an example embodiment, the slow SSThresh is set to the product of guaranteed bandwidth and round trip time. In another example embodiment, SSThresh is set to a value that keeps flow control in Slow Start mode where appropriate to ensure fast ramp up of the congestion window size.

At 506, the congestion window is set to an initial value. In an example embodiment, the congestion window is initialized to one segment (see IETF RFC 2001, January 1997). In other embodiments, the initial value for the congestion window is any value less than or equal to the product of guaranteed bandwidth and round trip time.

At 508, data is sent. The amount of data sent is limited by the current size of the congestion window. Once the data is sent, at 510 the transmitter waits for an acknowledgement (ACK). If an ACK was received (YES), at 512 the size of the congestion window is compared to the maximum value set for the congestion window. If the congestion window is less than the maximum value (YES) at 514 the size of the congestion window is increased. The amount of increase depends on a comparison of the current size of the congestion window with SSThresh. If the current size of the congestion window is less than or equal to SSThresh, the congestion window is increased at a first (e.g. exponential) rate, whereas if the current size of the congestion window is greater than SSThresh the congestion window is increased at a second (e.g. linear) rate.

If, at 510, an ACK is not received (NO), at 516 cwnd is reset to the initial value at 506. In an example embodiment, the value of SSThresh remains unchanged. At 508, data is again sent. Steps 506, 508, 510, 512, 514, 516 may be repeated as often as necessary to process the flow.

Figure 6:
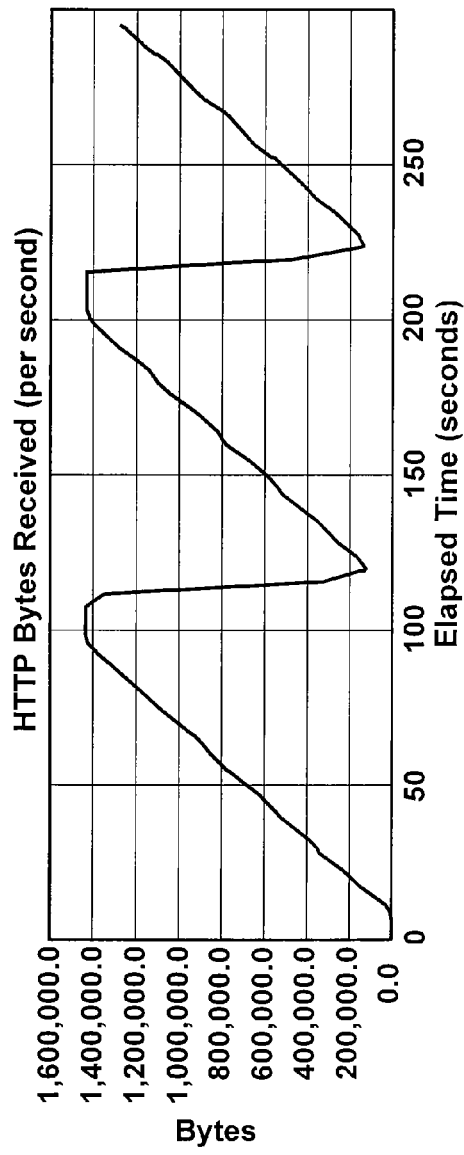
FIG. 6 illustrates an example diagram of a standard SCTP data flow with a roundtrip time of 300 ms.

FIG. 6 illustrates an example diagram of a standard SCTP data flow with a roundtrip time of 300 ms. This flow does not limit the size of the congestion window and whenever a collision is detected (for example no ACK is received for the flow), the congestion window is reset to an initial value and SSThresh is also changed.

Figure 7:
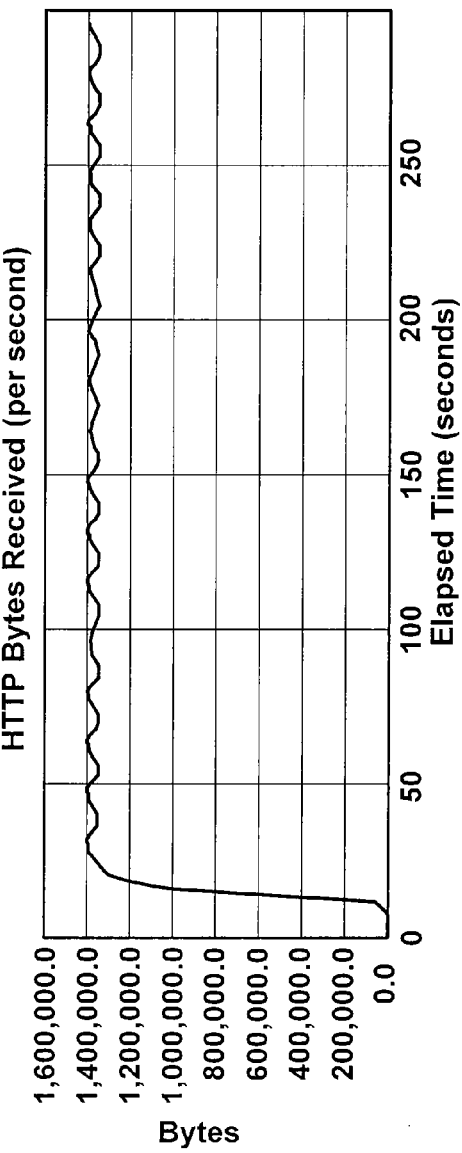
FIG. 7 illustrates an example diagram of a SCTP flow with a roundtrip time of 300 ms employing flow control techniques in accordance with an example embodiment described herein.

FIG. 7 illustrates an example diagram of a SCTP flow with a roundtrip time of 300 ms employing flow control techniques in accordance with an example embodiment described herein. For example, the congestion window is limited to a maximum value and the value of SSThresh remains unchanged.

Described above are example embodiments. It is, of course, not possible to describe every conceivable combination of components or methodologies, but one of ordinary skill in the art will recognize that many further combinations and permutations of the example embodiments are possible. Accordingly, this application is intended to embrace all such alterations, modifications and variations that fall within the spirit and scope of the appended claims interpreted in accordance with the breadth to which they are fairly, legally and equitably entitled.

The invention claimed is:

1. An apparatus, comprising:
a transceiver; and
flow control logic coupled to the transceiver and operable to control the operation of the transceiver;
wherein the flow control logic is configured to set a threshold for unacknowledged data that is proportional to a guaranteed bandwidth for the flow;
wherein the flow control logic is configured to send a predetermined amount of unacknowledged data for the flow;
wherein the flow control logic is configured to increase the predetermined amount of unacknowledged data responsive to receiving an acknowledgement of a previously sent unacknowledged data until reaching a maximum preset value;
wherein the maximum preset value is proportional to a maximum amount of available bandwidth for the flow; and
wherein the predetermined amount of unacknowledged data is increased a first predetermined amount responsive to receiving an acknowledgement of previously sent unacknowledged data within a predetermined amount of time and the predetermined amount of unacknowledged data is below the threshold, the predetermined amount of unacknowledged data is increased the first amount responsive to receiving an acknowledgement of previously sent unacknowledged data within the predetermined amount of time and the predetermined amount of unacknowledged data is equal to the threshold, and wherein the predetermined amount of data is increased a second amount responsive to receiving an acknowledgement of previously sent unacknowledged data within a predetermined amount of time and the predetermined amount of unacknowledged data is greater than the threshold, wherein the first amount increases faster than the second amount; and
wherein the predetermined amount of unacknowledged data is reset an initial value responsive to not receiving an acknowledgement for previously sent unacknowledged data within the predetermined time, wherein the threshold remains unchanged after resetting the predetermined amount of unacknowledged data to the initial value.

2. The apparatus of claim 1, wherein the maximum preset value is a product of maximum amount of available bandwidth for the flow and round trip time.

3. The apparatus of claim 1, wherein the threshold for unacknowledged data is a product of guaranteed bandwidth for the flow and round trip time.

4. The apparatus of claim 1, wherein the initial value for unacknowledged data is less than a product of guaranteed bandwidth for the flow and round trip time.

5. The apparatus of claim 1, wherein the initial value for unacknowledged data is a segment.

6. The apparatus of claim 1, wherein the first amount increases the predetermined amount of unacknowledged data exponentially and the second amount increases the predetermined amount of unacknowledged data linearly.

7. The apparatus of claim 6, wherein the maximum preset value is a product of maximum amount of available bandwidth for the flow and round trip time.

8. The apparatus of claim 7, wherein the first predetermined amount of unacknowledged data is a product of guaranteed bandwidth for the flow and round trip time.

9. A method, comprising:
setting by flow control logic a maximum value for a congestion window for a flow that is proportional to a maximum amount of available bandwidth for the flow;
setting a reset threshold by the flow control logic to a fixed value;

setting by the flow control logic a size of the congestion window for a predetermined amount of unacknowledged data to send before waiting for an acknowledgement;

sending the predetermined amount of data;

waiting for the acknowledgement;

increasing by the flow control logic the size of the congestion window responsive to receiving the acknowledgement within a predefined time period for previously sent data and congestion window is less than the maximum value;

wherein the congestion window is increased by an exponential amount responsive to the congestion window being less than the preset threshold;

wherein the congestion window is increased by a linear amount responsive to the congestion window being greater than the preset threshold; and resetting by the control logic the congestion window to an initial value responsive to not receiving an acknowledgement to previously sent data within the predetermined time period while maintaining the preset threshold at the fixed value.

10. The method of claim 9, wherein the maximum size for the congestion window is equal to a product of maximum allowable bandwidth and round trip time.

11. The method of 10, wherein the fixed value is equal to a product of guaranteed bandwidth and round trip time.

12. The method of 11, wherein the congestion window is initially set to a product of guaranteed bandwidth and round trip time.

13. The method of 12, wherein the flow is a Stream Transmission Control Protocol compatible flow and the preset threshold is a SSThresh compatible threshold.

14. The method of 13, further comprising setting the congestion window to the product of guaranteed bandwidth and round trip time responsive to not receiving an acknowledgement.

* * * * *

UNITED STATES PATENT AND TRADEMARK OFFICE
CERTIFICATE OF CORRECTION

PATENT NO. : 7,787,379 B2
APPLICATION NO. : 12/132089
DATED : August 31, 2010
INVENTOR(S) : Joji Thomas Mekkattuparamban and Akshya Kumar Singh It is certified that error appears in the above-identified patent and that said Letters Patent is hereby corrected as shown below:

In the Claims:

In claim 9, Column 8, starting at line 62, please replace the claim as followed:

--9. A method, comprising:
setting by flow control logic a maximum value for a congestion window for a flow that is proportional to a maximum amount of available bandwidth for the flow;
setting a preset threshold by the flow control logic to a fixed value;
setting by the flow control logic a size of the congestion window for a predetermined amount of unacknowledged data to send before waiting for an acknowledgement;
sending the predetermined amount of data;
waiting for the acknowledgement;
increasing by the flow control logic the size of the congestion window responsive to receiving the acknowledgement within a predefined time period for previously sent data and congestion window is less than the maximum value;
wherein the congestion window is increased by an exponential amount responsive to the congestion window being less than the preset threshold;
wherein the congestion window is increased by a linear amount responsive to the congestion window being greater than the preset threshold; and
resetting by the control logic the congestion window to an initial value responsive to not receiving an acknowledgement to previously sent data within the predetermined time period while maintaining the preset threshold at the fixed value.--

Signed and Sealed this

Twelfth Day of October, 2010

David J. Kappos
*Director of the United States Patent and Trademark Office*